Jan. 10, 1967   J. E. ROCHTE   3,296,941
LOGIC CONTROL SYSTEM
Filed Feb. 15, 1965
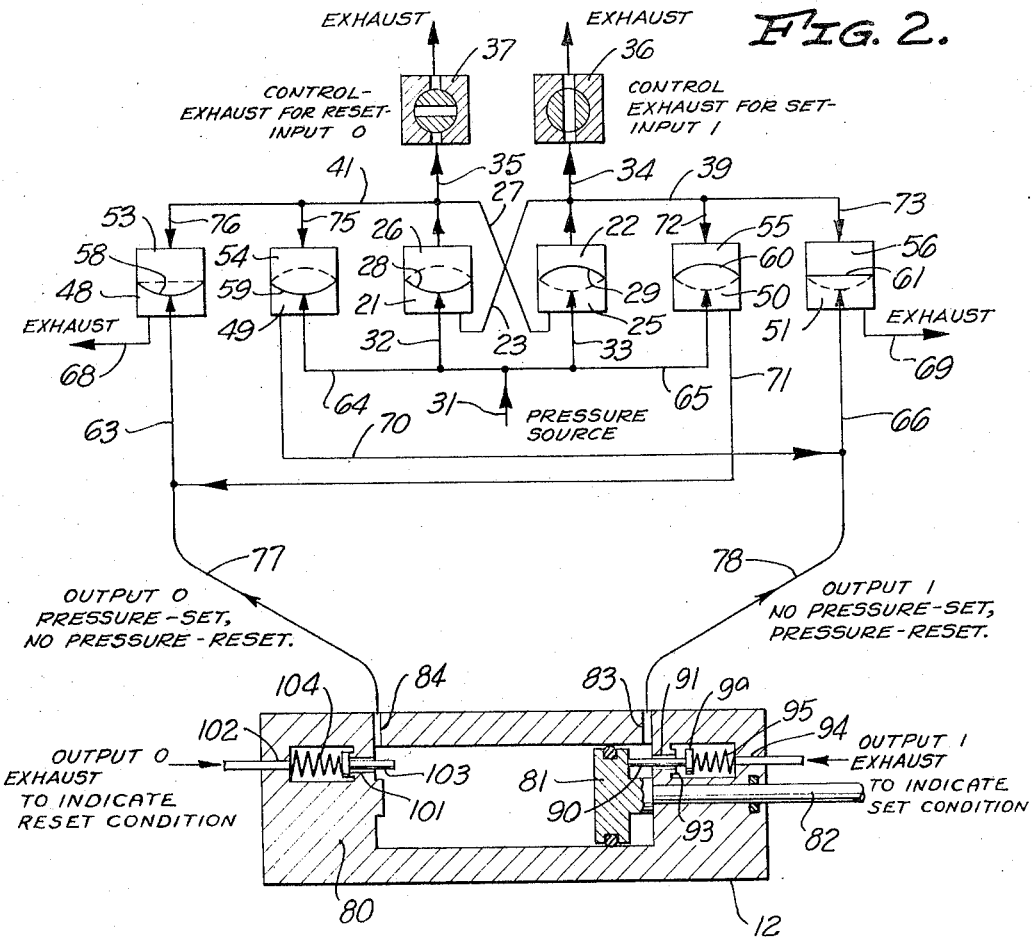
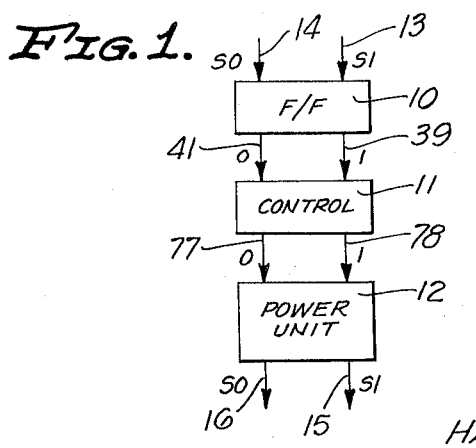
INVENTOR.
JERRY EDWARD ROCHTE
BY HIS ATTORNEYS
HARRIS, KIECH, RUSSELL & KERN

United States Patent Office 3,296,941
Patented Jan. 10, 1967

3,296,941
LOGIC CONTROL SYSTEM
Jerry Edward Rochte, Long Beach, Calif., assignor to Beckman Instruments, Inc., a corporation of California
Filed Feb. 15, 1965, Ser. No. 432,803
4 Claims. (Cl. 91—404)

This invention relates to logic control systems and, in particular, to combination control and power units having a consistent logic scheme.

It is an object of the invention to provide a unit which can receive logic input commands, perform the operations and then provide output logic signals indicative of completion of the operations. A further object is to provide such a unit which can have the input command signals and the output completion signals consistent in notation and in form.

It is a object of the invention to provide a logic control system including a power unit, a set-reset flip-flop, and a control member actuated by the flip-flop for controlling power input to the power unit. A further object is to provide such a system including logic output signal generators actuated by the power unit with the output signals being produced at the completion of the power unit operation.

It is an object of the invention to provide such a logic control system which can be utilized for any desired power operations. A further object is to provide such a system which is particularly adapted for operation in pneumatic systems and one which may utilize a pneumatic power unit and/or a pneumatic flip-flop and/or a pneumatic control valve.

It is an object of the invention to provide a control system having a logic output consistent with the logic input and including a power unit comprising a cylinder with a piston movable between set and reset positions with a pressure inlet at each end for moving the piston, a set exhaust valve in the power unit communicating with one of the inlets and engageable by the piston when in the set position to open the valve, a reset exhaust valve in the power unit communicating with the other of the inlets and engageable with the piston when in the reset position to open the valve, a control member for selectively connecting a pressure source to one of the power unit inlets and connecting the other inlet to an exhaust, a set-reset flip-flop comprising a bistable device having first and second stable states for controlling the control member, and means connecting the flip-flop to the control member for actuating the control member to move the piston to the set position when the flip-flop is set and to move the piston to the reset position when the flip-flop is reset such that setting of the flip-flop causes movement of the power unit to the set position followed by opening of the set exhaust valve and resetting of the flip-flop causes movement of the power unit to the reset position followed by opening of the reset exhaust valve.

The invention also comprises novel details of construction and novel combinations and arrangements of parts, which will more fully appear in the course of the following description. The drawing merely shows and the description merely describes a preferred embodiment of the present invention which is given by way of illustration or example.

FIG. 1 is a block diagram illustrating the control system of the invention; and

FIG. 2 is a schematic diagram illustrating one preferred embodiment of the invention.

The system as illustrated in FIG. 1 includes a flip-flop 10, a control member 11, and a power unit 12. The flip-flop 10 is a bistable device having first and second stable states usually referred to as the set and reset states or the one and zero states. The flip-flop is switched to the set state by a signal on the line 13 which may be referred to as the set one line. Similarly, the flip-flop is switched to the reset state by a signal on the line 14 which may be referred to as the set zero line.

The control member 11 is actuated by the flip-flop and controls the supply of power to the power unit 12. With a hydraulically or pneumatically powered system, the control member would normally be some form of valve while with an electrically powered system, the control member would normally be some form of switch. The power unit 12 does the actual physical work and typically may be a cylinder and piston but also could be an electrical solenoid or an electrical motor or the like. The power unit is moved to a set position or a reset position corresponding to the condition of the control member 11 which in turn changes condition in response to the state of the flip-flop 10. The power unit also provides output signals which are generated at the completion of the power operation. When the power unit moves to the set position, an output signal is produced on line 15, identified as the set one line. Similarly, when the power unit moves to the reset position, an output signal is generated on the line 16, the set zero line.

A significant embodiment of the invention incorporating a pneumatic flip-flop and a four-way valve controlling a pneumatic cylinder and piston unit is illustrated in FIG. 2. The particular flip-flop and four-way valve are those shown in the copending application of Rochte, Serial No. 322,879, filed November 12, 1963, "Bistable Pneumatic Logic Element and Valve," and assigned to the same assignee as the present application. Reference may be had to said copending application for more detailed descriptions of the flip-flop and valve and for some alternative forms.

The pneumatic flip-flop or memory element possesses two stable states after initial actuation, and has a pair of chamber means. The first chamber means comprises a first portion 21 and a second portion 22 interconnected by a conduit 23. The second chamber means has a first portion 25 and a second portion 26 interconnected by a conduit 27. The two chamber means are separated by pressure responsive means which in the illustrative embodiment of FIG. 2 may take the form of a pair of resilient diaphragms; diaphragm 28 separating the first portion 21 of the first chamber means from the second portion 26 of the second chamber means and diaphragm 29 separating the second portion 22 of the first chamber means from the first portion 25 of the second chamber means. Gas under pressure may be supplied to power input conduit 31, which is connected to power inputs conduits 32 and 33, the latter two somewhat restricted with respect to the other conduits within the system. Conduit 32 terminates within the first portion 21 of the first chamber means and conduit 33 terminates within the first portion 25 of the second chamber means. Control input conduits 34 and 35 connect respectively the second portion 22 of the first chamber means and the second portion 26 of the second chamber means to any suitable control means such, for example, as two-way valves 36 and 37. Output conduit 39 connected to the second portion 22 of the first chamber means is provided for taking an output pressure therefrom and may be connected to any suitable high impedance type utilization device, which in this embodiment is the control unit 11. In like manner, output conduit 41 is connected to the second portion 26 of the second chamber means and is provided for taking a second output from the memory element and may be connected to any suitable device, here the control unit 11.

In operation, control valves 36 and 37 are normally closed and are opened to place the flip-flop into one or the other of its stable states. Let it be assumed that both control elements 36 and 37 are initially closed and gas under pressure is being supplied through input conduit 31. Initially, pressure responsive means 28 and 29 will assume a position midway between the solid and dotted lines illustrated and gas under pressure will be supplied through each of conduits 32 and 33. Pressure in the first and second portions 21 and 22 of the first chamber means will equalize due to the interconnection by conduit 23, as will the pressure in the first and second portions 25 and 26 respectively of the second chamber means due to the interconnection of these two portions by conduit 27. Since gas under like pressure is being supplied to first portions 21 and 25 of each of the chamber means and since second portions 22 and 26 are interconnected therewith, the pressure on each side of pressure responsive means 28 and 29 is equal and they will remain in the neutral position. Since the pressure in second portions 22 and 26 is equal, the pressure in output conduits 39 and 41 is equal.

Let it now be assumed that the valve comprising control element 36 is momentarily opened (corresponding to a set one signal) such that the second portion 22 of the first chamber means is vented to the atmosphere or to some other low pressure area. Pressure in the second portion 22 of the first chamber means drops as does the pressure in the first portion 21 by virtue of the interconnecting conduit 23. A differential pressure is now created between the first and second chamber means, the first portion 21 of the first chamber means being at a low pressure and the second portion 26 of the second chamber means being at a high pressure. Under this condition pressure responsive means 28 is deflected to the position illustrated by the solid line which is arbitrarily designated the "set" position and operates to close power inlet conduit 32. A like differential pressure is created between second portion 22 of the first chamber means and the first portion 25 of the second chamber means, deflecting pressure responsive element 29 away from the inlet conduit 33.

Valve 36 may now be closed and pressure responsive elements 28 and 29 will remain in the condition illustrated by the solid line due to the differential pressure between the first and second chamber means, the high pressure in the second portion 26 of the second chamber means maintaining the element 28 against the inlet 32 to the first portion 21 of the first chamber means. Thus the pressure in the first chamber means remains at a low value while the pressure in the second chamber means remains at a high value. As is obvious, this condition will remain regardless of the condition of control element 36. Since the second portion 22 of the first chamber means is at a low pressure, the pressure in output conduit 39 is likewise low and, due to the high pressure in the second portion 26 of the second chamber means, the output pressure in output conduit 41 is at a high value. This differential pressure between the outputs 39 and 41 will remain until actuation of control elements 37 (i.e., until a set zero signal is received).

Let it now be assumed that control element 36 is closed and control element 37 is momentarily opened venting the second portion 26 of the second chamber means to the atmosphere or any other low pressure area. The pressure in the second portion 26 of the second chamber means drops to the same pressure present in the first portion 21 of the first chamber means and pressure responsive element 28 tends to return to its neutral position. Inlet conduit 32 to the first portion 21 of the first chamber means is then opened and the pressure in the first portion 21 and the second portion 22 of the first chamber means begins to increase deflecting pressure responsive element 28 to the position indicated by the dotted line. Since the first portion 25 of the second chamber means is now vented to a low pressure area by virtue of conduit 27 connected to the second portion 26 pressure responsive element 29 is deflected to the position indicated by the dotted line which is arbitrarily designated the "reset" position. In this position pressure responsive element 29 closes the power inlet conduit 23 to the first portion 25 of the first chamber means and the first chamber means remains at this low pressure condition. Since portion 25 of the second chamber means is at a low pressure and the second portion 22 of the first chamber means is at a high pressure, element 29 remains in the reset condition. Pressure responsive elements 28 and 29 will remain in the reset condition regardless of the condition of control element 37 so long as control element 36 remains closed. In the reset condition a high pressure exists in the output conduit 39 while a low pressure now exists in output conduit 41.

The four-way valve system forming the control unit 11 comprises eight additional chamber means 48–51 and 53–56. Cooperating pairs of the chamber means are separated by pressure responsive elements 58–61 respectively. Each of chamber means 48–51 has a corresponding inlet conduit 63–66 positioned in such a manner as to be closed by the associated pressure responsive element, inlet conduits 63 and 64 being closed when pressure responsive elements 58 and 59 are in the set condition as indicated by the solid lines and inlet conduits 65 and 66 being closed when pressure responsive element 60 and 61 are in the reset condition as indicated by the dotted lines. Chamber means 48 and 51 have respective outlet or exhaust conduits 68 and 69 to exhaust these chamber means to the atmosphere or any other low pressure area. Chamber means 49 has an outlet conduit 70 connected to inlet conduit 66 of chamber means 51 and chamber means 50 has an outlet conduit 71 connected to inlet conduit 63 of chamber means 48. Output conduit 39 of the pneumatic memory is connected to inlet conduit 72 of chamber means 55 and to inlet conduit 73 of chamber means 56. Outlet conduit 41 of the pneumatic memory is connected to inlet conduit 75 of chamber means 54 and to inlet conduit 76 of chamber means 53. Inlet conduit 63 of chamber means 48 and outlet conduit 71 of chamber means 50 are connected to a valve output conduit 77. Inlet conduit 66 of chamber means 51 and outlet conduit 70 of chamber means 49 are connected to a second valve output conduit 78. Output conduits 77 and 78 may be connected to any suitable utilization device such as the power unit 12.

In operation, let it be assumed that the bistable flip-flop is in the set condition under the influence of control element 36 such that the pressure responsive elements 28 and 29 are as indicated in solid lines in FIG. 2. Under this condition the pressure in output conduit 41 is high and the pressure in output conduit 39 is low. Since chamber means 48 is exhausted to the atmosphere via exhaust or output conduit 68, the high pressure created in chamber means 53 deflects the pressure responsive element 58 to the position indicated by the solid lines and closes inlet conduit 63.

Since the output in conduit 39 of the flip-flop is at a low pressure, pressure responsive element 61 remains in the neutral position illustrated and inlet conduit 66 of chamber means 51 is open to a low pressure area due to output conduit 69. The gas pressure input through power input conduit 64 to chamber means 49 is therefore initially exhausted to the atmosphere via the output conduit 70, input conduit 66 to chamber means 51 and exhaust conduit 69. Therefore, chamber means 49 assumes a low pressure and the high pressure output from memory output conduit 41 to the inlet 75 creates a high pressure in chamber means 54 thereby deflecting pressure responsive element 59 to close inlet conduit 64. Due to the low pressure in output conduit 39 of the memory element, chamber means 55 is at a low pressure while chamber means 50 is held at a high pressure due to the input from the pressure source via input conduits 31 and 65. Thus, pressure responsive element 60 assumes a position illustrated by the solid line. The high pressure of chamber means 50 is connected via output conduit 71 to input conduit 63 of chamber means 48 which is closed by pressure responsive element 58 in the set condition. This high pressure output is also supplied via valve output conduit 77 to one inlet of the power unit. The other inlet of the power unit is connected to valve output conduit 78 which is in turn connected to input conduit 76, chamber means 51 and exhaust conduit 69 to the atmosphere or other low pressure area. Outlet conduit 70 of chamber means 49 also assumes this low pressure by virtue of the inlet conduit 64 being closed by pressure responsive element 59. It is thus seen that the entire pressure from the power source connected to power input conduit 31 is transferred via conduits 65, 71 and 77 to one side of the utilization device. The other side of the utilization device is connected to a low pressure area via conduits 78, 66 and 69.

Let it now be assumed that control element 36 is in the closed condition and control element 37 is momentarily opened. Pressure responsive elements 28 and 29 will assume the reset position as indicated by the dashed lines for the reasons hereinbefore described. A high pressure is now created in output conduit 39 while output conduit 41 assumes a low pressure condition. With the high pressure created in chamber means 55 and 56 respectively pressure responsive elements 60 and 61 are deflected to the reset condition illustrated by the dashed lines and close inlet conduits 65 and 66. With the low pressure created in chamber means 53 and 54 respectively the pressure responsive elements 58 and 59 assume the reset condition indicated by the dotted lines and open inlet conduits 63 and 64. In the reset condition fluid under pressure is supplied via inlet conduit 31, conduit 64 to chamber means 49, via outlet conduit 70 thus creating a high pressure condition in valve outlet conduit 78 inasmuch as inlet conduit 66 of chamber means 51 is closed by deflection of element 61. Outlet conduit 77 assumes a low pressure condition by virtue of its connection through inlet conduit 63 to chamber means 48 and the exhaust conduit 68 also connected to chamber means 48. Thus a high pressure is created in valve output conduit 78 and a low pressure in valve outlet conduit 77. As is obvious the respective outputs of the valve will remain until subsequent actuation by the other control element to change the state of the flip-flop.

The power unit 12 as shown in FIG. 2 includes a cylinder 80 with a piston 81 movable within the cylinder chamber. A shaft 82 driven by the piston provides the output for doing the work of the unit. An inlet passage 83 is connected to the conduit 78 and a similar inlet passage 84 is connected to the conduit 77. With high pressure in the line 78 and low pressure in the line 77, the piston will be moved to the left from the set position of FIG. 2 to the reset position. Similarly with a high pressure in the conduit 77 and a low pressure in the conduit 78, the piston will be moved to the right from the reset position to the set position as shown in FIG. 2.

The power unit includes a pair of signal generating devices for providing set and reset output signals after the piston has moved to the set and reset positions respectively. In the preferred embodiment illustrated these signal generating units are valves built into the power unit, which valves may function as the control elements 36, 37 for another following control system. The set output signal unit comprises a valve stem 90 slidably positioned in a passage 91 and having a head 92 for engaging a valve seat 93 formed in the passage. The passage 91 provides communication between the inlet passage 83 and an output passage 94, with a spring 95 urging the valve to the passage closed condition. The stem 90 extends into the piston chamber for engagement by the piston 81 when the piston is in the set position of FIG. 2 to open the valve. When the piston moves to the left to the reset position, the valve will be closed.

A similar reset output signal valve structure is provided at the opposite end of the power unit and includes a passage 101 providing communication between the inlet 84 and an outlet 102. The stem 103 is engaged by the piston 81 when the piston is in the reset position to open the valve, while the spring 104 urges the valve to the closed position when the piston is in the set condition as shown in FIG. 2.

In the operation of the over-all system, opening of the control valve 36 connects the line 34 to a low pressure or exhaust. This causes the flip-flop to change to the set condition and causes the four-way valve to move to the set position thereby connecting the pressure source via lines 31, 65, 71 and 77 to the inlet 84 to move the piston to the set position. The inlet 83 is connected to the low pressure source or exhaust via lines 78, 66 and 69. When the piston has completed the travel and arrives at the set position, the set output signal valve in the power unit is opened, connecting the line 94 to the low pressure source or exhaust via passage 91, inlet 83 and lines 78, 66 and 69. The connection of the line 94 to exhaust may function to provide a set one or input one signal to a following logic system in the same manner as does the opening of the control valve 36. The line 94 may also be connected to line 35 in place of the control valve 37, causing the piston to automatically recycle to the reset position. If conduit 102 is then connected to line 34 in place of the valve 36, the entire system will oscillate from set to reset to set, etc. The logic notation is maintained consistent between input and output and the form, namely an exhaust or low pressure connection, is consistent. Also, the logic output from the system is not produced until the desired physical operation has been completed.

The operation is the same for a reset or input zero signal. When the valve 37 is opened, the flip-flop is changed to the reset state and the four-way valve is similarly changed, providing a high pressure at the inlet 83 of the power unit and a low pressure or exhaust connection at the inlet 84, moving the piston to the left, closing the output one or set valve of the power unit and, after the piston stroke is completed, opening the output zero or reset valve of the power unit.

It should be noted that while the logic control system has been illustrated herein as an all pneumatic system, it could be all or partly hydraulic and could be all or partly electrical. Also, it is not intended that the invention be limited to the particular flip-flop and four-way valve illustrated and that other units producing the same control function can be utilized.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim as my invention:

1. In a control system having a logic output consistent with the logic input, the combination of:
    a power unit comprising a cylinder with a piston movable between set and reset positions and having a pressure inlet at each end for moving said piston;
    a set exhaust valve in said power unit communicating with one of said inlets and engageable by said piston when in said set position to open said valve;
    a reset exhaust valve in said power unit communicating with the other of said inlets and engageable by said piston when in said reset position to open said valve;
    a four-way valve for selectively connecting a pressure source to one of said power unit inlets and connecting the other inlet to an exhaust;
    a pneumatically controlled set-reset flip-flop comprising a bistable device having first and second stable states for controlling said four-way valve;
    set and reset control valves for said flip-flop, with each of said control valves selectively connecting said flip-flop to an exhaust, with said flip-flop going to said first stable state when said set control valve is opened and going to said second stable state when said reset control valve is opened; and means connecting said flip-flop to said four-way valve for actuating said valve to move said piston to the set position when said flip-flop is set and to move said piston to the reset position when said flip-flop is reset such that opening of said set control valve causes movement of said power unit to said set position followed by opening of said set exhaust valve and opening of said reset control valve causes movement of said power unit to said reset position followed by opening of said reset exhaust valve.

2. In a control system having a logic output consistent with the logic input, the combination of:

a power unit having an output member movable between set and reset positions;

a set output signal unit in said power unit engageable by said output member when in said set position to produce a set signal;

a reset output signal unit in said power unit engageable by said output member when in said reset position to produce a reset signal;

a control member for selectively connecting a source of power to said power unit;

a set-reset flip-flop comprising a bistable device having first and second stable states for controlling said control member;

set and reset control units for said flip-flop, with each of said control units providing an input signal to said flip-flop, with said flip-flop going to said first stable state when said set control unit provides a set signal and going to said second stable state when said reset control unit provides a reset signal; and means connecting said flip-flop to said control member for actuating said control member to move said output member to the set position when said flip-flop is set and to move said output member to the reset position when said flip-flop is reset such that a set input signal causes movement of said output member to said set position followed by a set output signal and a reset input signal causes movement of said output member to said reset position followed by a reset output signal.

3. In a control system having a logic output consistent with the logic input, the combination of:

a power unit comprising a cylinder with a piston movable between set and reset positions and having a pressure inlet at each end for moving said piston;

a set exhaust valve in said power unit communicating with one of said inlets and engageable by said piston when in said set position to open said valve;

a reset exhaust valve in said power unit communicating with the other of said inlets and engageable by said piston when in said reset position to open said valve;

a control member for selectively connecting a pressure source to one of said power unit inlets and connecting the other inlet to an exhaust;

a set-reset flip-flop comprising a bistable device having first and second stable states for controlling said control member; and means connecting said flip-flop to said control member for actuating said control member to move said piston to the set position when said flip-flop is set and to move said piston to the reset position when said flip-flop is reset such that setting of said flip-flop causes movement of said power unit to said set position followed by opening of said set exhaust valve and resetting of said flip-flop causes movement of said power unit to said reset position followed by opening of said reset exhaust valve.

4. In a control system having a logic output consistent with the logic input, the combination of:

a power unit comprising a cylinder with a piston movable between set and reset positions and having a pressure inlet at each end for moving said piston;

a set exhaust valve in said power unit and comprising means defining a passage communicating with one of said inlets, means defining a valve seat, a plunger slidable in at least a portion of said passage and engageable with said seat to close said passage, and a spring urging said plunger to the passage closed condition, with said plunger engageable by said piston when in said set position to open said passage;

a reset exhaust valve in said power unit and comprising means defining a passage communicating with the other of said inlets, means defining a valve seat, a plunger slidable in at least a portion of said passage and engageable with said seat to close said passage, and a spring urging said plunger to the passage closed condition, with said plunger engageable by said portion when in said reset position to open said passage;

a four-way valve for selectively connecting a pressure source to one of said power unit inlets and connecting the other inlet to an exhaust;

a pneumatically controlled set-reset flip-flop comprising a bistable device having first and second stable states for controlling said four-way valve;

set and reset control valves for said flip-flop, with each of said control valves selectively connecting said flip-flop to an exhaust, with said flip-flop going to said first stable state when said set control valve is opened and going to said second stable state when said reset control valve is opened; and means connecting said flip-flop to said four-way valve for actuating said valve to move said piston to the set position when said flip-flop is set and to move said piston to the reset position when said flip-flop is reset such that opening of said set control valve causes movement of said power unit to said set position followed by opening of said set exhaust valve and opening of said reset control valve causes movement of said power unit to said reset position followed by opening of said reset exhaust valve.

References Cited by the Examiner

UNITED STATES PATENTS 3,156,157  11/1964  Smith et al. _____ 235—201
3,174,409  3/1965  Hill _____ 91—313

OTHER REFERENCES

Norwood and Noll, Shift Register with Pneumatically-Controlled Latch and Control Elements, I.B.M., Technical Disclosure Bulletin, volume 7, No. 4, September 1964.

MARTIN P. SCHWADRON, *Primary Examiner.*

P. E. MASLOUSKY, *Assistant Examiner.*